United States Patent [19]

Cordellini

[11] Patent Number: 5,276,949
[45] Date of Patent: Jan. 11, 1994

[54] CLAMPING MOUNT FOR MOTION PICTURE LIGHTING AND RIGGING EQUIPMENT

[76] Inventor: Steven L. Cordellini, 22 Council Crest Dr., Corte Madera, Calif. 94925

[21] Appl. No.: 879,866

[22] Filed: May 7, 1992

[51] Int. Cl.[5] ............................................. A44B 21/00
[52] U.S. Cl. ...................................... 24/569; 24/525; 24/535; 403/356
[58] Field of Search ............... 24/569, 525, 535, 514; 403/562, 556, 555, 395

[56] References Cited

U.S. PATENT DOCUMENTS

| 55,198 | 5/1866 | Baum | 403/356 |
|---|---|---|---|
| 573,745 | 12/1896 | Wilson | 24/569 |
| 757,451 | 4/1904 | Germain | 24/569 |
| 991,167 | 5/1911 | Parkinson | 24/569 |
| 1,205,717 | 11/1916 | Decker | 403/356 |
| 1,426,535 | 8/1922 | Barton | 24/525 |
| 1,516,489 | 11/1924 | Barton | 24/525 |
| 2,807,485 | 9/1957 | Seibert | 403/356 |
| 3,316,604 | 5/1967 | Leger | 24/525 |
| 3,469,810 | 9/1969 | Dorris | 24/525 |
| 4,718,151 | 1/1988 | Le Vahn et al. | 24/535 |

FOREIGN PATENT DOCUMENTS

| 0727364 | 3/1955 | United Kingdom | 24/569 |
| 098314 | 3/1965 | United Kingdom | 24/525 |

OTHER PUBLICATIONS

Catalogue of: Matthews Studio Equipment, 2405 Empire Ave., Burbank, Calif. 91504 12 pages; Apr. 1990.
Catalogue of: American Studio Equipment, 8922 Norris Ave., Sun Valley, Calif. 91352 3 pages; the 1990.
Catalogue of: Norms Studio Equipment, 5219 Craner Ave., North Hollywood, Calif. 91601 5 pages; Jan. 1992.

Primary Examiner—Victor N. Sakran

[57] ABSTRACT

An improved mount for motion Picture Lighting and Rigging Equipment. A strong, light-weight mount that can be quickly and securely clamped to a variety of objects of different sizes and shapes. The clamping jaw (22) (23) faces are always parallel to each other and are padded to protect the objects being clamped. All major components (21) (22) (23) (24) are rust proof. The components of the mount can be rearranged to suit specific clamping situations.

The shaft (21) of this mount will fit into existing support devices used in the motion picture industry. Thus, this mount can also be used to hold various objects on a movie set and serve as a connection between those objects and the existing support devices.

4 Claims, 4 Drawing Sheets

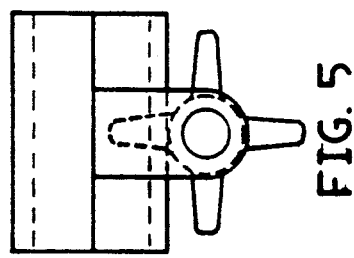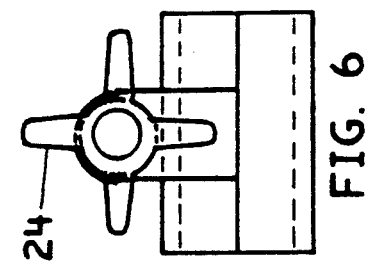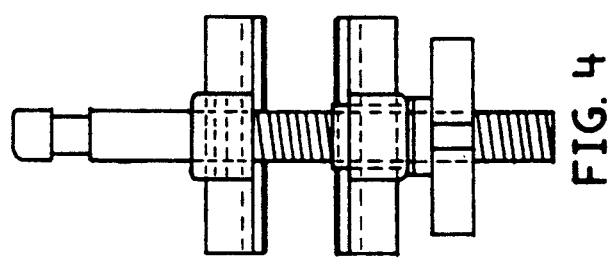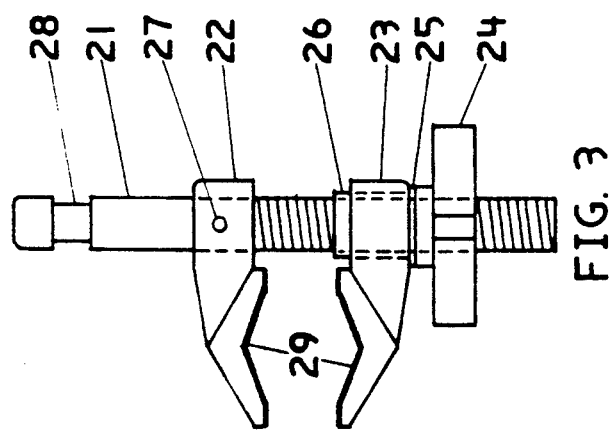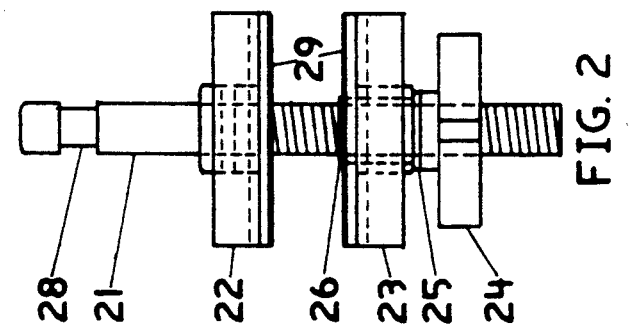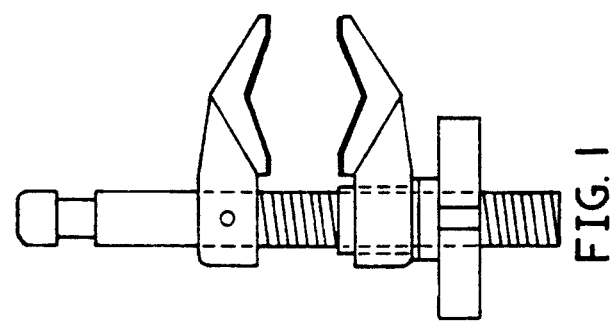

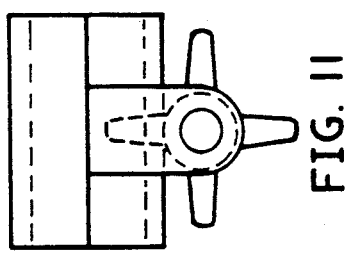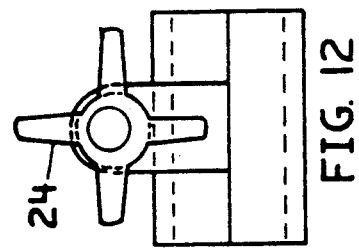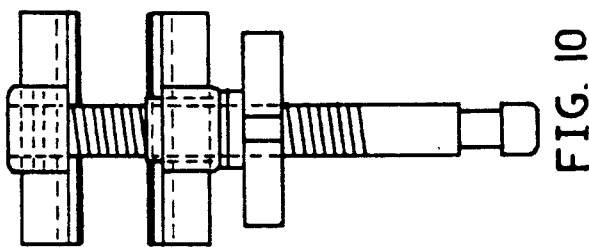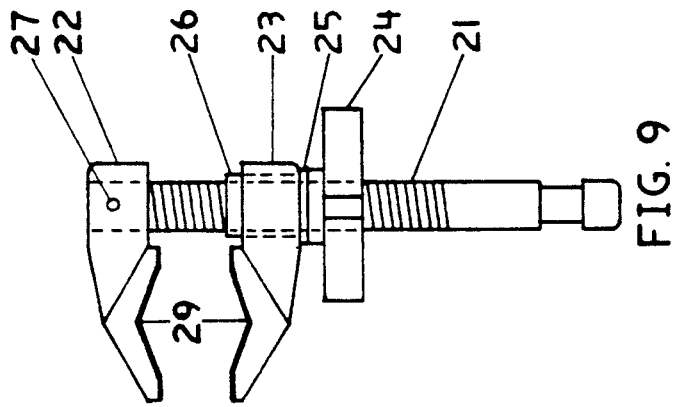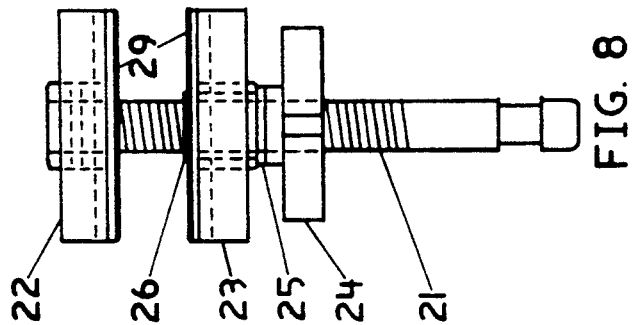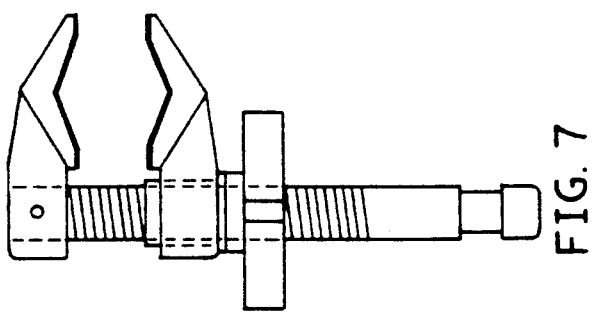

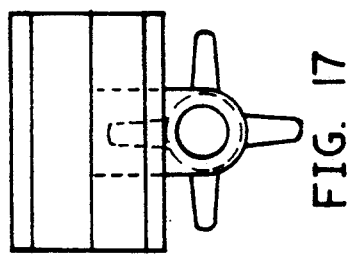
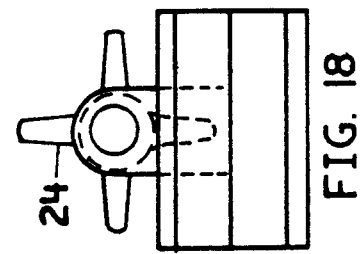
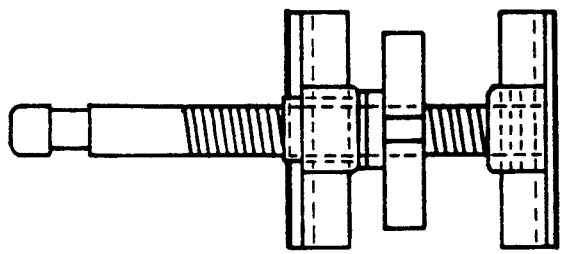
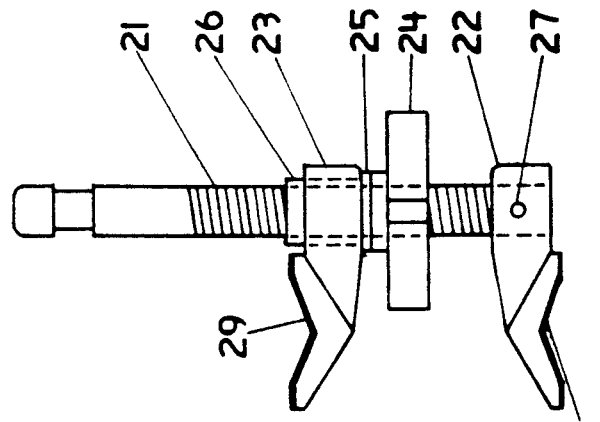
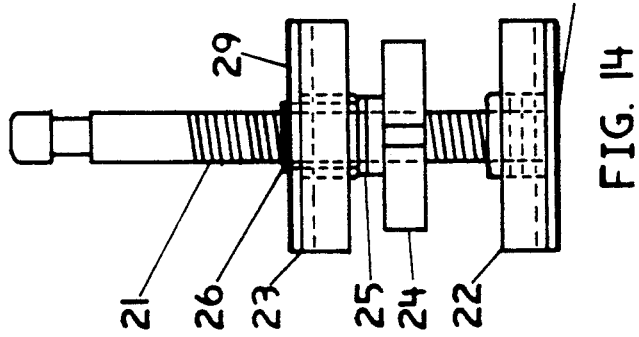
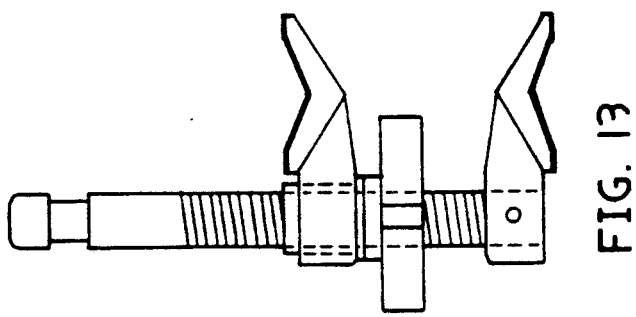

CLAMPING MOUNT FOR MOTION PICTURE LIGHTING AND RIGGING EQUIPMENT

BACKGROUND OF THE INVENTION

1. Field of Invention

This invention relates to Photography, specifically to a mount for lights and rigging equipment.

2. Description of Prior Art

In the evolution of modern movie lighting equipment two types of mounts have become standard in the industry. The larger lights have a 1 1/8" pin (Junior pin) which slips into a 1 1/8" receiver in the stands and other supports that hold these lights. The smaller lights have a 5/8" receiver which slips over a 5/8" pin (Baby pin) on the stands and other supports for these lights.

Much of the rigging equipment used by the grip department of a film crew also uses the baby pin. An example is the C-stand, a much used piece of equipment which holds flags and serves as a universal support. This is a folding 3-legged stand with a telescoping center post which terminates in a baby pin. Atop this pin is a "grip head" which rotates on the baby pin and holds a 5/8" extension arm. This arm terminates in a "knucklel1 which is designed to grab another 5/8" pin. So, the baby pin and the receptacles that fit it are the basic and multifunctional connectors for mounting lights and grip equipment.

Many devices have been developed to provide baby pins for mounting lights and grip equipment. The majority of these devises were created by attaching a baby pin to an existing mechanism or clamp. Each has a limited application which necessitates carrying many different devises from film location to film location.

The prior art referred to below can be found in the catalogues of companies that sell motion picture equipment. Attached are copies of catalogue pages that show the specific prior art. The names and addresses of these companies are given below.

Prior art items A through R are from the catalog of Matthews Studio Equipment Inc., 2405 Empire Ave., Burbank, CA 91504.

Items (A) and (B) are the Century stand (C-stand) and the grip head and extension arm referred to earlier.

Item (C) Standard C-Clamp with one or more baby pins welded to it. These clamps are heavy and slow to open & close. They have little stability from side to side and tend to rotate around the small circular jaw faces. Some have special jaws for clamping pipe, but even those don't hold well on cylindrical objects. The jaws of these clamps tend to mar the surface they are clamped to and their size and shape make it difficult to get them into tight spots. Over time and after use in wet weather, the threaded shafts of these clamps rust and make it difficult to operate the clamps.

Item (D) Furniture Clamp with 5/8" pin. These clamps are long and useful if clamping something 6" or more thick. They will not clamp to cylindrical objects. They mar the surfaces they are clamped to and these clamps also tend to rotate around their small jaw faces.

Item (E) Chain Vise Grip. These devises clamp by tightening a length of chain around an object. These clamps tend to scratch or dent objects they are clamped around. They can only clamp to objects that can be encircled with the chain and they are not stable from side to side perpendicular to the circle of chain.

Item (F) Vise Grip. These clamps will securely grab flat objects (those with parallel planer faces) up to 111 thick. When opened wider than 111 the jaws do not hold securely because they do not remain parallel as they open. When opened over 111 the jaws are further apart at the end away from the pivot point than they are at the end near the pivot point. This makes the clamp slip off the object it is clamped to. When trying to clamp cylindrical objects over 1 1/2" diameter, the non-parallel jaws will again cause slippage.

The strong clamping force of these clamps, and the small contact area and teeth of the jaws will mark the wood or metal that they are clamped to.

Item (G) Baby Grid Clamp. These clamps form a good attachment on cylindrical objects. They are limited though to diameters between 1 1/4" to 1 1/2". The jaws are not padded and they require a wrench to attach and detach them.

Item (H) Baby Pipe Clamp. These clamps form a secure attachment for hanging a light on 1 1/2" to 2 1/2 "pipe. They do not attach well on smaller diameters. The lock bolt always leaves a mark and they require a wrench to attach or detach. Because the jaw is no more than 1 1/4" wide, they are not stable enough side to side to use for mounting most rigging equipment.

Item (I) McMatth Clamp. This clamp is well designed and forms a strong attachment to various sizes and shapes. It does have padded jaws. Its size and weight (8 pounds), however, make it unacceptable for almost all applications on location and most applications in the studio.

Items (J) and (K) The Gaffer Grip and Grip-A-Light. Both of these are spring loaded clamps and will support only small lighting instruments. The jaws do not remain parallel so contact area on flat surfaces is usually small. As a mount for grip equipment they are severely limited.

Item (L) Baby Plate. This is a plate with a perpendicular baby pin. It is usually attached with screws. It's often used to mount a light on the top of a set wall. It takes time and tools to attach or detach and it leaves screw holes when removed.

Item (M) Drop Ceiling Scissor Clamp. Used to hang lights from conventional T-bar drop ceiling frames only.

Item (N) Heavy Duty Flag Clamp. These grab cylindrical shapes only, have no padding and weigh 3 pounds. They will mar a surface they are clamped on.

(0) Baby Matth Pipe Adapter. This is a light duty clamp which grabs cylindrical shapes only. Very limited applications.

(P) Crowder Hanger. Made specifically to mount on 2×4 or 2×6 lumber. (Q) and (R) Mafer Clamp and Foto Clamp. See end of Prior Art text.

Prior art items (S) and (T) are in the catalog from American Studio Equipment, 8922 Norris Ave., Sun Valley, CA 91352

(S) Magazine Clamp. This is an adaptation of a set of jaws from a hobby vise called a Pan-A-Vise. It comprises two flat parallel jaws with a nominal capacity of 0" to 6" and a baby pin. This clamp is attached to the film magazine of a camera in order to brace the camera for a moving shot. This is often accomplished by attaching one end of a C-stand grip head and extension arm to the magazine clamp and the other end to an adjacent secured baby pin clamp of some sort. This is not a heavy duty clamp. Its jaws are not designed to grab cylindrical objects. This clamp is usually used only for the aforementioned purpose.

(T) 2×4 slider—this is designed strictly for attaching a baby pin to a length of 2×4 lumber.

Prior Art (U) through (X) are in the catalog from Norms Studio Equipment, 5219 Craner Ave., North Hollywood, CA 91601.

(U) Bead Board Holder. This is a baby pin welded to a vise grip which has been fitted with large (approximately 6" by 6" by 1/16") flexible jaws. These jaws are designed for holding 4' by 8' sheets of foam core or styrene bead board. The clamp is held in place by grabbing the baby pin with a C-stand arm or some other means of support. This clamp can be used to support other objects but the jaws limit such use. The jaws are quite flexible and they do not stay parallel when opened so they are not secure enough to hold more than a few pounds. This clamp could be used for mounting small lights in some circumstances, but it is not a common practice.

(V) Super Clamp. See end of Prior Art text.

(W) Clamp with ⅝" male. This is a light weight spring clamp with a baby pin. The limited holding power of this spring clamp limits the use to very lightweight rigging equipment (maximum 2 lbs.).

The following clamps have been grouped together and left for last because they most closely relate to the object of this application.

(Q) Mafer Clamp, (R) Foto Clamp, and (V) Super Clamp. These are clamps specifically built to use for Photography. The Foto clamp is a less rugged, less expensive version of the Mafer Clamp. The Super clamp is yet another version of the same clamp.

The Mafer clamp was intended to be light-weight and versatile. It was intended to be used for mounting lights and rigging equipment and for supporting various objects on the set. This clamp is indeed light-weight but the design of the jaws has limited its versatility. The design of the hinged jaw is such that the jaw travels 3 times the distance that the threaded shaft of the tightening knob travels. This reduces the amount of leverage on the jaw. It is often difficult to get this clamp tight enough to hold firmly.

The pad on the fixed v-shaped jaw is plastic and in spite of a cross-hatched pattern does not grip well. So, this clamp slips on smooth round surfaces. The smaller the diameter of the object being clamped, the greater the tendency to slip. This is partially because the hinged jaw presses 1" diameter and smaller objects against one side of the V-notch rather than into the center of the V where the V shape has a pinching effect. On cylindrical objects this clamp is only affective an 1¼" to 2" diameters and does not work well on smooth surfaces.

When clamping flat objects the jaws are ineffective over a thickness of 1¼". Thus, this clamp will not grab 1½" thick lumber. It is common in the film business to need to clamp to 2×4, 2×6, or 2×12 lumber. A different clamp is needed to do this.

This clamp does not work well on thin or flexible sheet material either because the jaws are not in direct opposition when they contact the material being clamped. The hinged jaw contacts the material between the two edges of the V-grooved jaw. Thus, thin or flexible materials bend or break when clamped.

Lateral stability can also be a problem with this clamp. This is partially because the jaws are only 1¾" wide, but more of the problem is again in the design of the jaws. When clamping cylindrical objects, such as a 1" outside diameter pipe, the face of the hinged jaw is nearly parallel to the inside face of the V-notch. The pipe is not forced into the V-notch where its lateral movement would be limited. Instead, due to the give in the 3/16" thick rubber pad on the upper jaw, the pipe can move sideways between the nearly parallel jaws.

When it comes to supporting objects on the set, this clamp is again limited by its jaw design. There seem to be few shapes that can be securely held in this clamp.

As yet there is no clamping mount that is indeed light-weight and will securely clamp a wide range of objects of various shapes and dimensions.

OBJECTS AND ADVANTAGES

Accordingly, several objects and advantages of my invention are:

a) to provide a mount for motion picture lights and rigging equipment that will clamp to objects of various shapes and dimensions.

b) to provide a mount that will hold securely and be stable in all directions.

c) to provide a mount that will not damage the surface of the object it is clamped to.

d) to provide a clamp which can be attached or detached quickly.

e) to provide a mount that is light-weight and compact.

f) to provide a mount made of rust-proof materials.

g) to provide a mount where the shaft that the light or rigging equipment mounts on is the backbone of the clamp rather than a piece that is added on to the clamp.

h) to provide a clamp on which the opposing jaw faces are always parallel.

i) to provide a mount that can be attached and detached without the use of tools.

j) to provide a clamp that will fit in tight spaces.

k) to provide a mount that can be disassembled and its components rearranged to suit specific needs.

l) to provide a mount which can also be used to hold and support various items which are to be photographed or which affect the lighting of what is being photographed.

m) to provide a clamping mount which will do the jobs of many of the existing prior art and thus reduce the amount of equipment that must be carried from location to location.

Further objects and advantages of my invention will become apparent from a consideration of the drawings and insuing description of it.

DESCRIPTION OF DRAWINGS

FIG. 1 hows the left view of the preferred embodiment.

FIG. 2 shows the front view of the preferred embodiment.

FIG. 3 shows the right view of the preferred embodiment.

FIG. 4 shows the back view of the preferred embodiment.

FIG. 5 shows the top view of the preferred embodiment.

FIG. 6 shows the bottom view of the preferred embodiment.

FIG. 7 shows the left view of #1 alternative embodiment.

FIG. 8 shows the front view of #1 alternative embodiment.

FIG. 9 shows the right view of #1 alternative embodiment.

FIG. 10 shows the back view of #1 alternative embodiment.

FIG. 11 shows the top view of #1 alternative embodiment.

FIG. 12 shows the bottom view of #1 alternative embodiment.

FIG. 13 shows the left view of #2 alternative embodiment.

FIG. 14 shows the front view of #2 alternative embodiment.

FIG. 15 shows the right view of #2 alternative embodiment.

FIG. 16 shows the back view of #2 alternative embodiment.

FIG. 17 shows the top view of #2 alternative embodiment.

FIG. 18 shows the bottom view of #2 alternative embodiment.

REFERENCE NUMERALS IN DRAWINGS

Figure 22:
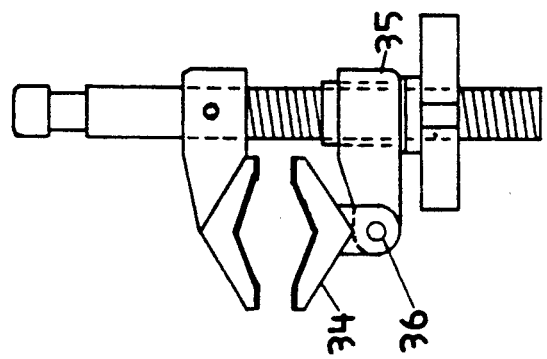
FIG. 22 shows the right view of #4 alternative embodiment.

21: Shaft
22: Fixed Jaw
23: Sliding Jaw
24: Knob
25: Washer
26: Sleeve
27: Pin
28: Recess
29: Rubber Jaw Pad
30: Keyway
31: Key-Screw
32: Link
33: Groove
34: Pivoting Jaw
35: Sliding Jaw Arm
36: Pivot Pin

DESCRIPTION

As shown in FIGS. 2 and 3 my mount comprises a ⅜" diameter shaft 21 which is partially threaded and has a recess 28 near the unthreaded end. This recess 28 receives the locking bolt of a ⅜" female mounting receptacle.

FIGS. 2 and 3 also show two jaws which are elements of the clamp portion of my mount. There is one fixed jaw 22 which is held to the shaft 21 by a pin 27. There is one sliding jaw 23. Pressed into this sliding jaw 23 is a sleeve 26 which rides on the shaft 21 when the sliding jaw 23 is moved along the shaft 21. The faces of both jaws 22 and 23 are covered by rubber pads 29.

FIG. 6 best shows the knob 24 which has internal threads and rides on the threaded portion of the shaft 21.

Between the knob 24 and the sliding jaw 23 is a washer 25 as shown in FIGS. 2 and 3.

To prevent rust I have chosen non-ferrous materials for all the major components. The shaft 21 and sleeve 26 are stainless steel. The jaws 22 and 23 and the knob 24 are aluminum. The washer 25 is nylon. The pin 27 is hardened steel.

FIGS. 7 through 12 show an additional embodiment. All parts are the same, they are just arranged differently.

FIGS. 13–18 show another embodiment. Again, all parts are the same, they are just arranged differently.

Figure 20:
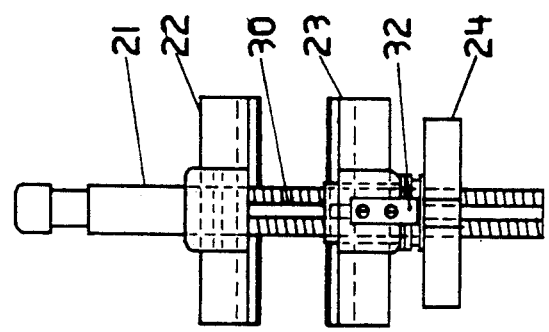
FIG. 20 shows the back view of #3 alternative embodiment.
Figure 19:
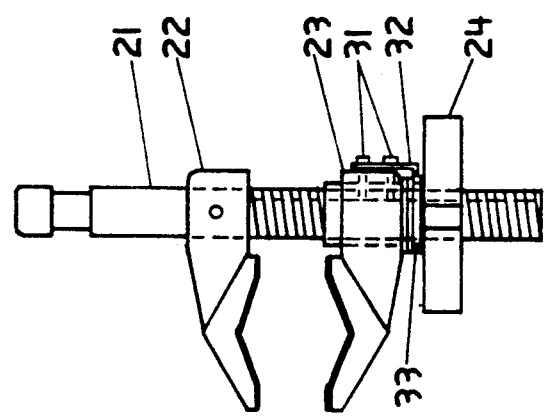
FIG. 19 shows the right view of #3 alternative embodiment.

FIGS. 19 and 20 show an embodiment that has a keyway 30 in the threaded portion of the shaft 21. Also shown are two key-screws 31 which ride in the keyway 30 and attach the link 32 to the sliding jaw 23. The link 32 can be pressed down into the groove 33 in the knob 24 in order to connect the sliding jaw 23 to the knob 24.

Figure 21:
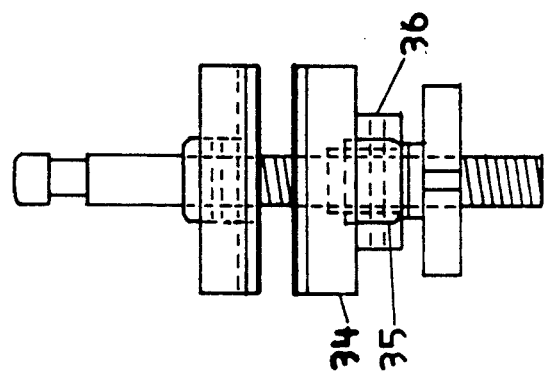
FIG. 21 shows the front view of #4 alternative embodiment.

FIGS. 21 and 22 show an embodiment with a pivoting jaw 34 attached to a sliding jaw arm 35 by a removable pivot pin 36.

OPERATION

FIGS. 1–6

The knob 24 is spun counterclockwise and moved down the threaded portion of the shaft 21. This allows the sliding jaw 23 to be moved down the shaft 21 away from the fixed jaw 22. The object to be clamped is placed between the jaws 22 and 23. The sliding jaw 23 is then moved up the shaft toward the fixed jaw 22 and against the object being clamped. Then the knob 24 is spun clockwise, moving it up the threaded portion of the shaft 21 pushing the washer 25 against the sliding jaw 23. Turning the knob 24 further in a clockwise direction puts pressure on the sliding jaw 23 in the direction of the fixed jaw 22. The fixed jaw 22 can not move along the shaft 21 because the pin 27 passes through the arm of the fixed jaw 22 and the shaft 21. So, the object between the jaws 22 and 23 is held tight by the force of the threaded knob 24. The rubber jaw pads 29 keep the jaws from damaging the object being clamped.

The sleeve 26 is stainless steel and longer than the hole through the arm in the sliding jaw 23. Thus, the sleeve 26 keeps the softer aluminum jaw 23 from binding on the threads of the shaft 21.

To mount a light or piece of rigging hardware the mounting receptacle on said equipment is slipped over the unthreaded end of the shaft 21. The lockbolt on said mounting receptacle is tightened into the recess 28 on the shaft 21.

If the objective is instead to support the object that has been clamped, the shaft 21 is mounted in a century stand or other type of supporting device.

The embodiment shown in FIGS. 7 through 12 operates the same as described above.

The embodiment shown in FIGS. 13 through 18 operates differently than those in FIGS. 1 through 12. In this embodiment the parts are rearranged. The jaws 22 and 23 are turned so the V-grooves are faced away from each other. The knob 24 moves the sliding jaw 23 away from the fixed jaw 22. This embodiment can be locked in a gap between two fixed objects. For example, it could be locked into the space between two buildings or between two balusters of a railing.

FIGS. 19 and 20 show an embodiment that has a keyway 30 in the threaded portion of the shaft 21. Riding in the keyway 30 are two key-screws 31 which serve two purposes. The key-screws 31 keep the sliding jaw 23 from rotating on the shaft 21. The key-screws 31 also attach the link 32 to the sliding jaw 23. This link 32 can be pressed down so that the L-shaped end of the link 32 goes into the groove 33 in the hub of the knob 24. Thus, when the knob 24 is rotated and moved away from the fixed jaw 22, it pulls the sliding jaw 23 away from the fixed jaw 22. This allows the sliding jaw 23 to be freed should it bind on the shaft 21 due to overtightening the clamp.

FIGS. 21 and 22 show an embodiment that has a pivoting jaw 34 on a sliding jaw arm 35. This allows the pivoting jaw 34 to pivot to match the angle of the surface it is being clamped to. Removing the pivot pin allows for interchanging jaws.

Conclusion, Ramifications and Scope of Invention

Thus the reader will see that the mount of this invention provides a compact and light-weight mount for motion picture lighting and rigging equipment that will clamp to various size and shape objects. This mount will provide a strong attachment which is stable in all directions, but will not damage the surface of the object being clamped. It will attach or detach quickly without the use of tools. The threaded knob can be spun on the shaft to rapidly open or close the clamp. It is rust-proof. The shaft that the lights mount on is an integral part of the clamp, not something that has been added on. The jaw faces are always parallel and provide maximum surface contact on flat objects being clamped. The jaws are V-grooved to provide a secure attachment to cylindrical objects. The parts of the clamp can be rearranged to suit particular clamping requirements. The embodiment shown in FIGS. 7-12 can reach into tight places or behind cylindrical objects closely mounted to walls or ceilings.

This mount has additional advantages in that:

This mount, when held in a Century Stand or other means of support, can be used to hold signs, mirrors, branches, paintings, etc. without marring their surfaces.

This mount can be used to brace an object by clamping one mount to the object and one to an adjacent secure structure, then joining the two mounts with the grip head and extension arm of a Century Stand.

This mount can be clamped to a standard light stand and the light mounted perpendicular to the stand allowing the light to reach over a tabletop or other obstacle.

This mount can be used to hold lighting equipment for still photography.

This mount will perform the functions of many of the devices referred to in the text on Prior Art. It will do the jobs of the Baby Grid Clamp (G), Baby Pipe Hanger (H), Gaffer Grip (J), Grip-A-Light (K), Drop Ceiling Scissor Clamp (M), Magazine Clamp (S), 2×4 Slider (T), Clamp with $\frac{5}{8}$" male (W), C-Clamp Adapter with $\frac{5}{8}$" pin or Frame Holder (X), Mafer Clamp with $\frac{5}{8}$" pin (Q), Foto Clamp with $\frac{5}{8}$" pin (R) and Super Clamp with $\frac{5}{8}$" pin (V).

This mount will also perform some of the functions of all the remaining prior art referred to. Thus it can reduce the number of clamps that must be carried to film locations.

This mount will mount a light to the top of a set wall in 1/10th the time it takes to screw on a Baby plate.

This mount, with a 7" long shaft, weighs the same as a Mafer clamp with $\frac{5}{8}$" pin. It will *securely* clamp to cylindrical objects from $\frac{5}{8}$" to 2" in diameter. It will *securely* clamp to flat objects from 0 to 2" thick. With a longer shaft this mount could clamp up to $2\frac{1}{2}$" diameters and flat objects at least 4" thick.

While my above description contains many specificities, these should not be construed as limitations on the scope of the invention, but rather as an exemplification of one preferred embodiment thereof. Many other variations are possible. For example: A mount that can employ different style jaws which are interchangeable; a mount with a means, not involving the knob, of freeing the sliding jaw should it become bound on the shaft due to overtightening; a mount which receives the $1\frac{1}{8}$" Junior Pin of the larger motion picture lights; a mount with jaws that are V-grooved on both sides and a means of moving the jaws either toward each other or away from each other; or a mount with a shaft that is other than cylindrical and a means of moving the jaws on that shaft.

Accordingly, the scope of the invention should be determined not just by the embodiments illustrated, but by the appended claims and their legal equivalents.

I claim:

1. A clamping device onto which photographic lighting and rigging equipment will mount comprising:
   a) a shaft having first and second ends, one of said ends being provided with a threaded portion, said threaded end portion being provided with a sliding means for a jaw member,
   b) a plurality of jaws which ride on said shaft and hold said shaft to various objects, one of said jaws is fixedly mounted to one of said ends of the shaft and the other jaw is slidably mounted to the other end of said shaft, wherein said jaws comprise flat end portions and oppositely opposed v-shaped intermediate portions which grip both cylindrical and flat surfaces, as well as other variously shaped objects,
   c) threaded means for moving and holding said jaws along said shaft, whereby applying pressure on said jaws and on said objects being clamped, such as an internally threaded knob which turns on said threaded portion of said shaft.

2. The clamping device of claim 1 wherein said sliding jaw is keyed into a keyway in said shaft, thus allowing said sliding jaw to move along said shaft but not allowing said sliding jaw to rotate on said shaft.

3. The clamping devise of claim 1 wherein the jaw face of said sliding jaw can pivot to match the angle of said object being clamped.

4. The clamping device of claim 1, further including a means of freeing said sliding jaw should said sliding jaw bind on said shaft.

* * * * *

UNITED STATES PATENT AND TRADEMARK OFFICE
CERTIFICATE OF CORRECTION

PATENT NO. : 5,276,949
DATED : January 11, 1994
INVENTOR(S) : Steven L. Cardellini It is certified that error appears in the above-indentified patent and that said Letters Patent is hereby corrected as shown below:

On the title page Item (19) under "United States Patent" "Cordellini" should read --Cardellini--.

Column 1, line 24, "knucklell" should read --knuckle--.

Column 1, line 68, "111" should read --1--.

Column 2, line 1, "111" should read --1--.

Column 2, line 3, "111" should read --1--.

Column 4, line 51, "hows" should read --shows--.

Signed and Sealed this

Twenty-fourth Day of May, 1994

Attest:

BRUCE LEHMAN

*Attesting Officer*  *Commissioner of Patents and Trademarks*